(12) United States Patent
Starr et al.

(10) Patent No.: US 8,154,995 B2
(45) Date of Patent: Apr. 10, 2012

(54) SYSTEM AND METHOD OF MANAGING DIGITAL DATA TRANSMISSION

(75) Inventors: Thomas J J Starr, Barrington, IL (US); Eugene L. Edmon, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1151 days.

(21) Appl. No.: 11/043,444

(22) Filed: Jan. 26, 2005

(65) Prior Publication Data

US 2006/0165011 A1 Jul. 27, 2006

(51) Int. Cl.
*G01R 31/08* (2006.01)
*H04B 7/00* (2006.01)
*H04B 7/212* (2006.01)

(52) U.S. Cl. ........ 370/229; 370/230; 370/310; 370/321; 370/235; 370/252; 370/347

(58) Field of Classification Search .................. 370/229, 370/347, 310, 321, 252, 235, 230
See application file for complete search history.

(56) References Cited

U.S. PATENT DOCUMENTS

| | | | |
|---|---|---|---|
| 3,993,867 A | 11/1976 | Blood, Jr. | |
| RE30,111 E | 10/1979 | Blood, Jr. | |
| 4,387,466 A | 6/1983 | Sire | |
| 4,450,555 A | 5/1984 | Pays | |
| 4,598,396 A | 7/1986 | Upp et al. | |
| 4,604,740 A | 8/1986 | Gandini et al. | |
| 4,750,169 A | 6/1988 | Carse et al. | |
| 4,756,007 A | 7/1988 | Qureshi et al. | |
| 5,119,365 A | 6/1992 | Warner et al. | |
| 5,140,616 A | 8/1992 | Renner | |
| 5,151,927 A | 9/1992 | Medlicott | |
| 5,201,045 A | 4/1993 | Pflueger et al. | |
| 5,208,803 A | 5/1993 | Conforti et al. | |
| 5,214,650 A | 5/1993 | Renner et al. | |
| 5,222,130 A | 6/1993 | Pflueger et al. | |
| 5,283,827 A | 2/1994 | Conforti et al. | |
| 5,343,461 A | 8/1994 | Barton et al. | |

(Continued)

FOREIGN PATENT DOCUMENTS

WO 2004004284 A1 1/2004

OTHER PUBLICATIONS

International Search Report and Written Opinion of the International Searching Authority for International Application No. PCT/US05/46383, Mailed on Sep. 21, 2006.

(Continued)

*Primary Examiner* — John Blanton
(74) *Attorney, Agent, or Firm* — Toler Law Group, PC

(57) ABSTRACT

A method of managing data transmission is provided and includes measuring a first number of payload bits communicated over a bearer during a first time period. The first number of measured payload bits is divided by a length of the first time period to yield a short term average bit rate for the first time period. Also, a bit rate margin is added to the short term average bit rate for to yield a total bearer bit rate for the first time period. Further, a bearer bit rate can be selectively provisioned based on the total bearer bit rate for the first time period. The bearer bit rate can be provisioned based on whether the bearer is a fixed bearer or an adaptive bearer.

28 Claims, 4 Drawing Sheets

U.S. PATENT DOCUMENTS

| | | | |
|---|---|---|---|
| 5,388,092 | A | 2/1995 | Koyama et al. |
| 5,410,754 | A | 4/1995 | Klotzbach et al. |
| 5,434,860 | A | 7/1995 | Riddle |
| 5,499,269 | A | 3/1996 | Yoshino |
| 5,504,736 | A | 4/1996 | Cubbison, Jr. |
| 5,740,241 | A | 4/1998 | Koenig et al. |
| 5,768,368 | A | 6/1998 | Koenig et al. |
| 5,796,742 | A | 8/1998 | Klotzbach et al. |
| 5,870,466 | A | 2/1999 | Koenig et al. |
| 5,881,148 | A | 3/1999 | Koenig et al. |
| 5,909,445 | A | 6/1999 | Schneider |
| 5,970,139 | A | 10/1999 | Koenig et al. |
| 6,144,639 | A * | 11/2000 | Zhao et al. ............ 370/235 |
| 6,144,736 | A | 11/2000 | Koenig et al. |
| 6,154,489 | A * | 11/2000 | Kleider et al. ............ 375/221 |
| 6,290,506 | B1 | 9/2001 | Milner |
| 6,307,839 | B1 | 10/2001 | Gerszberg et al. |
| 6,310,909 | B1 | 10/2001 | Jones |
| 6,466,088 | B1 | 10/2002 | Rezvani et al. |
| 6,490,250 | B1 * | 12/2002 | Hinchley et al. ............ 370/232 |
| 6,512,739 | B1 | 1/2003 | Heidari et al. |
| 6,546,509 | B2 | 4/2003 | Starr |
| 6,549,520 | B1 | 4/2003 | Gross et al. |
| 6,606,430 | B2 | 8/2003 | Bartur et al. |
| 6,626,591 | B1 * | 9/2003 | Bellotti et al. ............ 398/79 |
| 6,728,238 | B1 | 4/2004 | Long et al. |
| 6,760,303 | B1 * | 7/2004 | Brouwer ............ 370/229 |
| 6,760,434 | B1 | 7/2004 | Rezvani et al. |
| 6,778,525 | B1 | 8/2004 | Baum et al. |
| 7,200,672 | B2 * | 4/2007 | Senda ............ 709/232 |
| 2001/0008544 | A1 * | 7/2001 | Ishiyama ............ 375/240.12 |
| 2001/0030998 | A1 | 10/2001 | Yong |
| 2002/0044528 | A1 * | 4/2002 | Pogrebinsky et al. ........ 370/230 |
| 2002/0090029 | A1 * | 7/2002 | Kim ............ 375/240.03 |
| 2003/0007509 | A1 | 1/2003 | Tzannes et al. |
| 2003/0043785 | A1 * | 3/2003 | Liu et al. ............ 370/352 |
| 2003/0112887 | A1 | 6/2003 | Sang et al. |
| 2003/0112966 | A1 | 6/2003 | Halder et al. |
| 2003/0118177 | A1 | 6/2003 | Karakas et al. |
| 2005/0039103 | A1 * | 2/2005 | Azenko et al. ............ 714/776 |
| 2005/0102412 | A1 * | 5/2005 | Hirsimaki ............ 709/232 |

OTHER PUBLICATIONS

European Exam Report for Application No. 05 855 012.0-2416, Dated Feb. 19, 2009.

Supplemental European Search Report from the European Patent Office for corresponding EP Application No. 05855012.0-2416/ 1842303, PCT/US2005046383, dated Feb. 2, 2009, 3 pages.

EPO Communication for Application No. 05855012.0-2416, 3 pages, dated Feb. 19, 2009, 3 pages.

Response to EPO Communication dated Feb. 19, 2009 for Application No. 05855012.0-2416, dated Jun. 22, 2009, 8 pages.

EPO Communication for Application No. 05855012.0-2416, 6 pages, dated Apr. 6, 2010.

* cited by examiner

SYSTEM AND METHOD OF MANAGING DIGITAL DATA TRANSMISSION

FIELD OF THE DISCLOSURE

The present disclosure relates generally to digital transmission systems.

BACKGROUND

Digital data transmission systems, such as, digital subscriber line (DSL) systems, have quickly emerged as a high quality solution for high speed Internet access and other services associated with high speed Internet services, such as, voice over Internet protocol (VoIP) and streaming video services. These systems can provide for multiple physical layer bearers. Separate bearers can be used to provide distinct data transmission characteristics that may be needed for different types of data and different applications. For example, voice data may require low latency, while video data may require a low error rate. Error control coding and interleaving of bearer channels generally result in a trade-off between latency and error rate.

Typically, each bearer is a distinct channel that can convey a portion of the total data payload to be transmitted over a communication line. Bearers can be implemented by assigning a certain subset of the total payload data bits in each physical layer frame. Further, the bit rate for each bearer is determined by a parameter stored in a data object for use with a simple network management protocol-management information base (SNMP-MIB). MIB objects can be controlled via GET and SET messages from an element management system (EMS). The bit rate for each bearer is typically set when a particular service is provisioned. The bit rate may change in response to changes in the transmission quality or changes to the service characteristics.

The bit rate for a particular bearer may need to change is response to beginning or ending a session for an application. For example, the bit rate may need to be changed in response to changing a number of simultaneous video programs that are being transmitted on a line. Additionally, an application may need to dynamically change a bit rate for a bearer. For example, a video program may need to change a bit rate as the content changes between standard definition video and high definition video. As a result, the bit rate for a bearer may need to change within a fraction of a second. However, the standard element management systems typically perform operations with a delay of ten to thirty seconds.

Also, it is inefficient to set a bit rate for a bearer at a high level for a long period of time since other bearer's within the same line could make use of the additional capacity. As such, the bearer bit rate should ideally increase almost instantly when necessary and decrease when the added capacity for the bearer is not needed.

Accordingly, there is a need for an improved system and method of managing data bit rates for digital data transmission.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
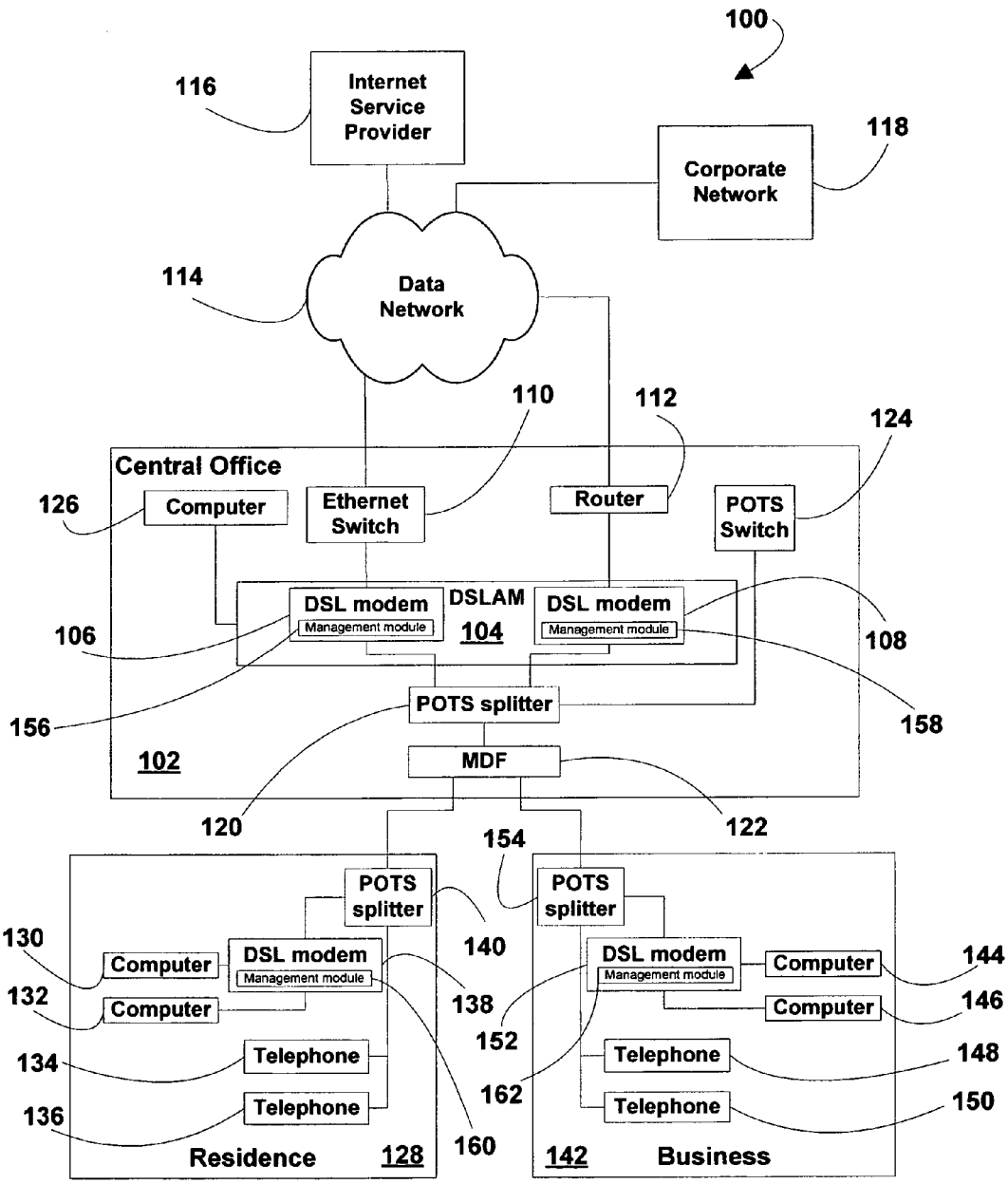
FIG. 1 is a diagram of an exemplary DSL network.

A method of managing data transmission is provided and includes measuring a first number of payload bits communicated over a bearer during a first time period. The first number of measured payload bits is divided by a length of the first time period to yield a short term average bit rate for the first time period. Also, a bit rate margin is added to the short term average bit rate for to yield a total bearer bit rate for the first time period. Further, a bearer bit rate can be provisioned based on the total bearer bit rate for the first time period.

In a particular embodiment, the bearer bit rate is provisioned based on whether the bearer is a fixed bearer or an adaptive bearer. Particularly, for an adaptive bearer, the total bearer bit rate for the first time period is determined as described above and then, the total bearer bit rate can be rounded up to a next quantum level for the bearer to yield the provisioned bearer bit rate. Also, for a fixed bearer, the bearer bit rate can be provisioned to a predefined fixed bit rate that is independent of the short term average bit rate. Further, in a particular embodiment, the method includes modifying a provisioned bearer bit rate after determining that the provisioned bearer bit rate is not between a maximum bearer rate and a minimum bearer rate.

In a particular embodiment, the method also includes summing a plurality of provisioned bearer bit rates for a line to yield a measured line bit rate. The measured line bit rate can be reduced to a maximum line bit rate. In a particular embodiment, a change from a first line bit rate to a second line bit rate is delayed. Alternatively, the change from the first line bit rate to the second line bit rate is not delayed. In a particular embodiment, the change from the first line bit rate to the second line bit rate occurs in within a predetermined time period. For example, the change from the first line bit rate to the second line bit rate can occur in less than one second.

In a particular embodiment, the method further includes resetting a rate change timer. Further, a second number of payload bits communicated over the bearer is measured for a second time period when the rate change timer reaches a threshold. Additionally, the bearer bit rate is re-provisioned based on a total bearer bit rate for the second time period. Also, the bearer bit rate is re-provisioned based on whether the bearer is a fixed bearer or an adaptive bearer.

In another embodiment, a method of executing a rate change for a bearer is provided and includes determining a new bearer bit rate for the bearer. Thereafter, a number of payload bits is allocated in a frame to be transmitted to the bearer. A transmission configuration message is sent and indicates the new bearer bit rate to a receiving device. A new line bit rate is determined based on the new bearer bit rate.

In yet another embodiment, a method of managing data transmission is provided and includes monitoring an error rate in a bearer in the direction of data transmission for a first time period. Further, the method includes determining whether the error rate is greater than a threshold. The bit rate of the bearer is reduced a predetermined amount, after determining that the error rate is greater than the threshold.

Referring to FIG. 1, an exemplary, non-limiting embodiment of a DSL network is shown and is generally designated 100. In a particular embodiment, the DSL network can be an ADSL network, an ADSL 2 network, an ADSL 2+ network, or a very high data rate DSL (VDSL) network. As illustrated in FIG. 1, the DSL network 100 includes a central office (CO) 102 in which a DSL access multiplexer (DSLAM) 104 can be located. A first central DSL modem 106 and a second central DSL modem 108 are located in the CO 102. In the case in which the DSL network is an ADSL network, each DSL modem in the CO 102 can be an ADSL terminating unit-central office (ATU-C). In a particular embodiment, the first DSL modem 106 and the second DSL modem 108 are installed in the DSLAM 104.

In an illustrative embodiment, a layer 2/layer 3 switch 110 is connected to the first DSL modem 106 and a router 112 is connected to the second DSL modem 108. In a particular embodiment, the layer 2/layer 3 switch 110 is an asynchronous transfer mode (ATM) switch or an Ethernet switch. As shown, the layer 2/layer 3 switch 110 and the router 112 are connected to a data network 114, e.g., the Internet. As such, in a particular embodiment, the layer 2/layer 3 switch 110 and the router 112 provide data network connectivity to the first DSL modem 106 and the second DSL modem 108. In an illustrative embodiment, an Internet service provider (ISP) 116 is connected to the data network 114. Moreover, in an illustrative embodiment, a corporate network 118 is connected to the data network 114. For simplicity, only one ISP 116 and only one corporate network 118 is shown connected to the data network 114, but any number of ISPs and any number of corporate networks 118 can be connected to the data network 114.

FIG. 1 further shows that the CO 102 includes a plain old telephone service (POTS) splitter 120 that can be connected to the first DSL modem 106 and the second DSL modem 108. Also, a main distribution frame (MDF) 122 is connected to the POTS splitter 120. A POTS switch 124 can be connected to the POTS splitter 120 in order to switch incoming telephone calls received at the CO 102. Additionally, the CO 102 includes a managing computer 126 that can be connected to the DSLAM 104. In a particular embodiment, the managing computer 126 can be used to manage the DSL network 100 and to enhance or optimize the performance of the DSL network 100.

As depicted in FIG. 1, the DSL network 100 can be connected over a communication line, e.g., a telephone line, to a remotely located customer residence 128 that includes a first computer 130 and a second computer 132. FIG. 1 also shows a first telephone 134 and a second telephone 136 that are located at the customer residence 128. As shown in FIG. 1, the first computer 130 and the second computer 132 are connected to a remote DSL modem 138. In the case that the DSL network 100 is an ADSL network, the remote DSL modem 138 can be an ADSL terminating unit-remote (ATU-R). The remote DSL modem 138 is connected to a remote POTS splitter 140 that, in turn, is connected over the communication line to the MDF 122 at the CO 102. Accordingly, either the first central DSL modem 106 or the second central DSL modem 108 can communicate with the remote DSL modem 138 via the POTS splitter 120, the MDF 122, and the remote POTS splitter 140 in order to provide network connectivity to the computers 130, 132.

FIG. 1 shows that the telephones 134, 136 are also connected to the remote POTS splitter 140. Telephone calls made by the telephones 134, 136 can be routed to the POTS switch 124 at the CO 102 via the remote POTS splitter 140, the MDF 122, and the POTS splitter 120. In the exemplary, non-limiting embodiment of the DSL network 100 shown in FIG. 1, two computers 130, 132 and two telephones 134, 136 are illustrated, but a lesser or larger number of computers and telephones can be located in the customer residence 128 and connected to the CO 102 based on a desired configuration.

FIG. 1 illustrates that the DSL network 100 can further include a customer business 142 in which a first computer 144 and a second computer 146 are located. A first telephone 148 and a second telephone 150 can also be located at the customer business 142. As shown in FIG. 1, the first computer 144 and the second computer 146 are connected to a remote DSL modem 152. In a particular embodiment, the remote DSL modem 152 is connected to a remote POTS splitter 154 that, in turn, is connected to the MDF 122. Accordingly, either the first central DSL modem 106 or the second central DSL modem 108 can communicate with the remote DSL modem 152 via the POTS splitter 120 within the CO 102, the MDF 122, and the remote POTS splitter 154 in order to provide network connectivity to the business computers 144, 146.

FIG. 1 shows that the business telephones 148, 150 are also connected to the remote POTS splitter 154. Telephone calls made by the telephones 148, 150 can be routed to the POTS switch 124 located at the CO 102 via the remote POTS splitter 154, the MDF 122, and the POTS splitter 120. In an illustrative embodiment, two business computers 144, 146 and two business telephones 148, 150 are illustrated, but any number of business computers and business telephones can be located in the customer business 142 and connected to the CO 102 based on a desired configuration.

In a particular embodiment, data can be transmitted over the DSL network 100 using transmission control protocol/Internet protocol (TCP/IP), file transfer protocol (FTP) (e.g., for large files), user datagram protocol (UDP) (e.g., for VoIP and streaming video), or real-time transport protocol (RTP) (e.g., for streaming video files or streaming audio files). Further, in a particular embodiment, each modem 106, 108, 138, 152 can include a bit rate management module 156, 158, 160, 162 that can adjust the bit rate of data transmitted based on the type of data being transmitted.

Figure 2:
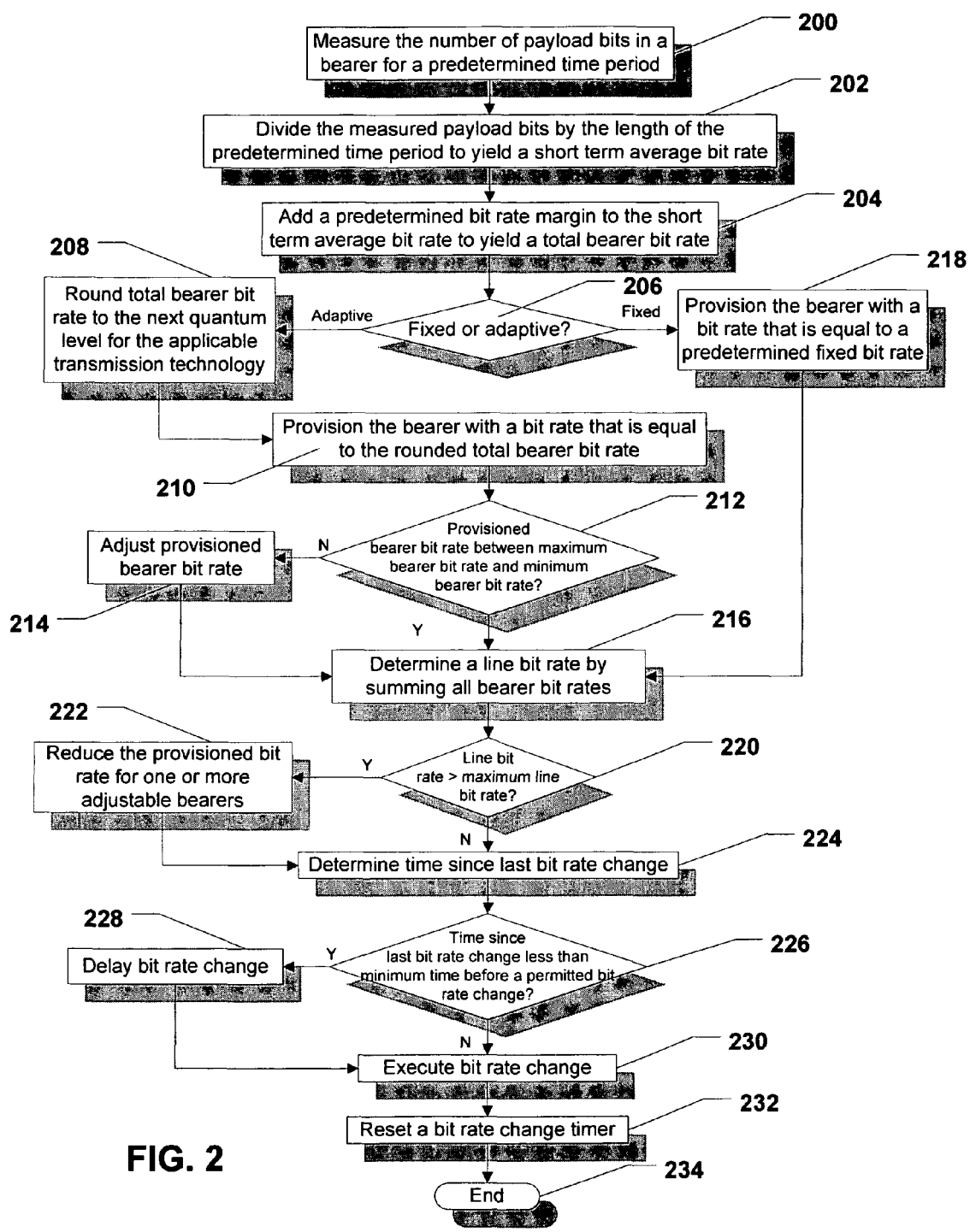
FIG. 2 is a flow chart to illustrate an exemplary method of managing data transmission in a DSL network.

Referring to FIG. 2, a method of managing data transmission in a DSL network is shown and commences at block 200 where a bit rate management module within a DSL modem measures the number of payload bits in a bearer for a predetermined time period. Next, at block 202, the bit rate management module divides the measured payload bits by the length of the predetermined time period to yield a short term average bit rate. At block 204, the bit rate management module adds a predetermined bit rate margin to the short term average bit rate to yield a total bearer bit rate. In a particular embodiment, the bit rate margin is an amount of bit rate that is added to the short term average bit rate in order to protect against short peaks in traffic rate. The bit rate margin can be a set value or a proportional increase, e.g., a percentage of the short term average bit rate.

Continuing to decision step 206, the bit rate management module determines whether the bearer is a fixed bearer or an adaptive bearer, i.e., whether or not the bearer requires adjustment of its bit rate by the bit rate management module. If the bearer is an adaptive bearer, the method moves to block 208 and the bit rate management module rounds the total bearer bit rate up to a next quantum level for the DSL network. In an exemplary, non-limiting embodiment, the step size from one quantum level to another quantum level is sixty-four kilobits per second (64 kb/s). Next at block 210, the bit rate management module provisions the bearer with a bit rate that is equal to the rounded total bearer bit rate.

At decision step 212, the bit rate management module determines whether the provisioned bearer bit rate is between a maximum bearer bit rate and a minimum bearer bit rate. If not, the bit rate management module adjusts the provisioned bearer bit rate at block 214 so that it is between the range determined by the maximum bearer bit rate and the minimum bearer bit rate. The method then moves to block 216. At decision step 212, if the provisioned bearer bit rate is between the maximum bearer bit rate and the minimum bearer bit rate, the method proceeds to block 216. Returning to decision step 206, if the bearer is a fixed bearer, the method moves to block 210 and the bit rate management module provisions the bearer with a bit rate that is equal to a predetermined fixed bit rate that is independent of the short term average bit rate. From block 218, the method proceeds to block 216.

At block 216, the bit rate management module determines a line bit rate by summing all provisioned bearer bit rates for each of the bearers of a line. At decision step 220, the bit rate management module determines whether the line bit rate is greater than a maximum line bit rate. If so, the bit rate management module reduces the provisioned bearer bit rate for one or more of the bearers within the line, at block 222, and the method then moves to block 224. Returning to decision step 220, if the line bit rate is not greater than the maximum line bit rate, the method moves to block 224 and the bit rate management module determines the time since the last bit rate change occurred for one or more of the bearers within the line.

Thereafter, the method proceeds to decision step 226 and the bit rate management module determines whether the time since the last bit rate change is less than a minimum time before a permitted bit rate change. If so, at block 228, the bit rate management module delays the bit rate change until the minimum time is met. Thereafter, the bit rate management module executes the bit rate change at block 230. Returning to decision step 226, if the time since the last bit rate change is not less than the minimum time before a permitted bit rate change, the method continues to block 230 and the bit rate change is executed. At block 232, the bit rate management module resets a rate change timer. In a particular embodiment, the rate change timer can be set so that the time between bit rate change is relatively small so that changes in bit rate occur relatively quickly. For example, the rate change timer can be set so that bit rate changes occur every second or fraction of a second, e.g., one-tenth of a second. The method then ends at state 234.

In a particular embodiment, the method described above can be performed in both directions of data transmission by the modems on each end of a DSL line or the method may optionally be performed in one direction. For example, the method illustrated in FIG. 2 can be performed by a management module within a DSL modem at a CO. Also, the method illustrated in FIG. 2 can be performed by a management module within a DSL modem located at a residence or business. Further, the method can be performed multiple times, e.g., each time that the bit rate change timer indicates that a bit rate change is permitted.

In a particular embodiment, a computer program including logic to implement one or more of the method steps can be executed by a bit rate management module within each modem. Executing the method within the modems can result in a quicker response time and a simpler design. In an alternative embodiment, the method steps can be executed at any other network element within the DSL network coupled to a particular line or channel within the DSL network.

Figure 3:
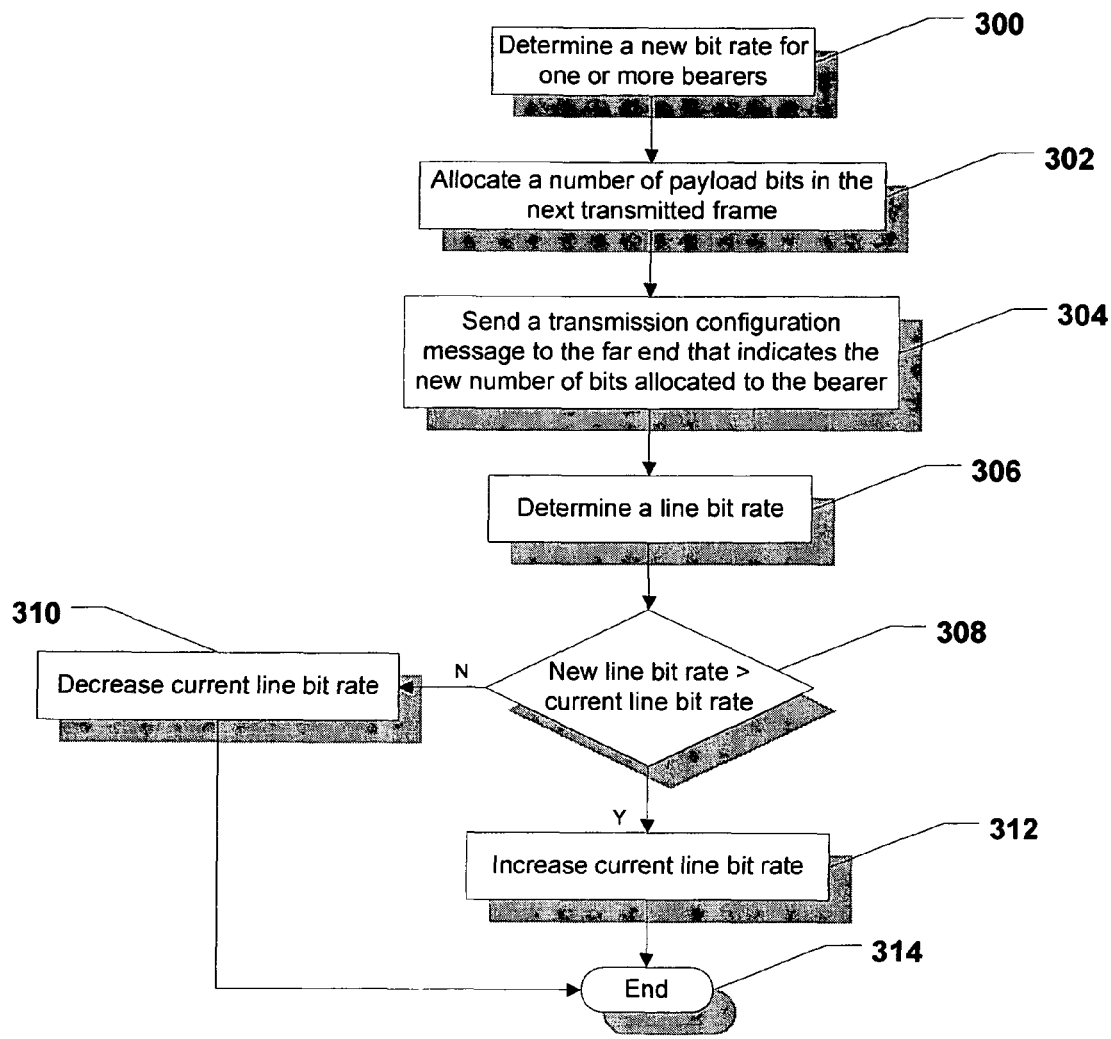
FIG. 3 is a flow chart to illustrate an exemplary method of executing a bit rate change for a bearer within a DSL network.

Referring to FIG. 3, a method of executing a data bit rate change is shown and commences at block 300. At block 300, a bit rate management module determines a new bearer bit rate for one or more bearers within a particular line. Next, at block 302, the bit rate management module allocates a number of payload bits for the bearer in a frame to be transmitted, e.g., the next frame to be transmitted. At block 304, the bit rate management module causes the transmitting modem to send a transmission configuration message to the receiving modem that indicates the new bit rate allocated to the particular bearer.

Moving to block 306, a new line bit rate is determined based on the new bearer bit rate. Thereafter, at decision step 308, the bit rate management module within the receiving modem determines whether the new line bit rate is greater than the current line bit rate. If not, the method proceeds to block 310 and the bit rate management module within the receiving modem determines that the new bit rate is lower than the current bit rate and decreases the current line bit rate to the new line bit rate. On the other hand, if the new line bit rate is greater than the current line bit rate, the method moves to block 312 and the bit rate management module within the receiving modem increases the current line bit rate to the new line bit rate. The method ends at state 314.

Figure 4:
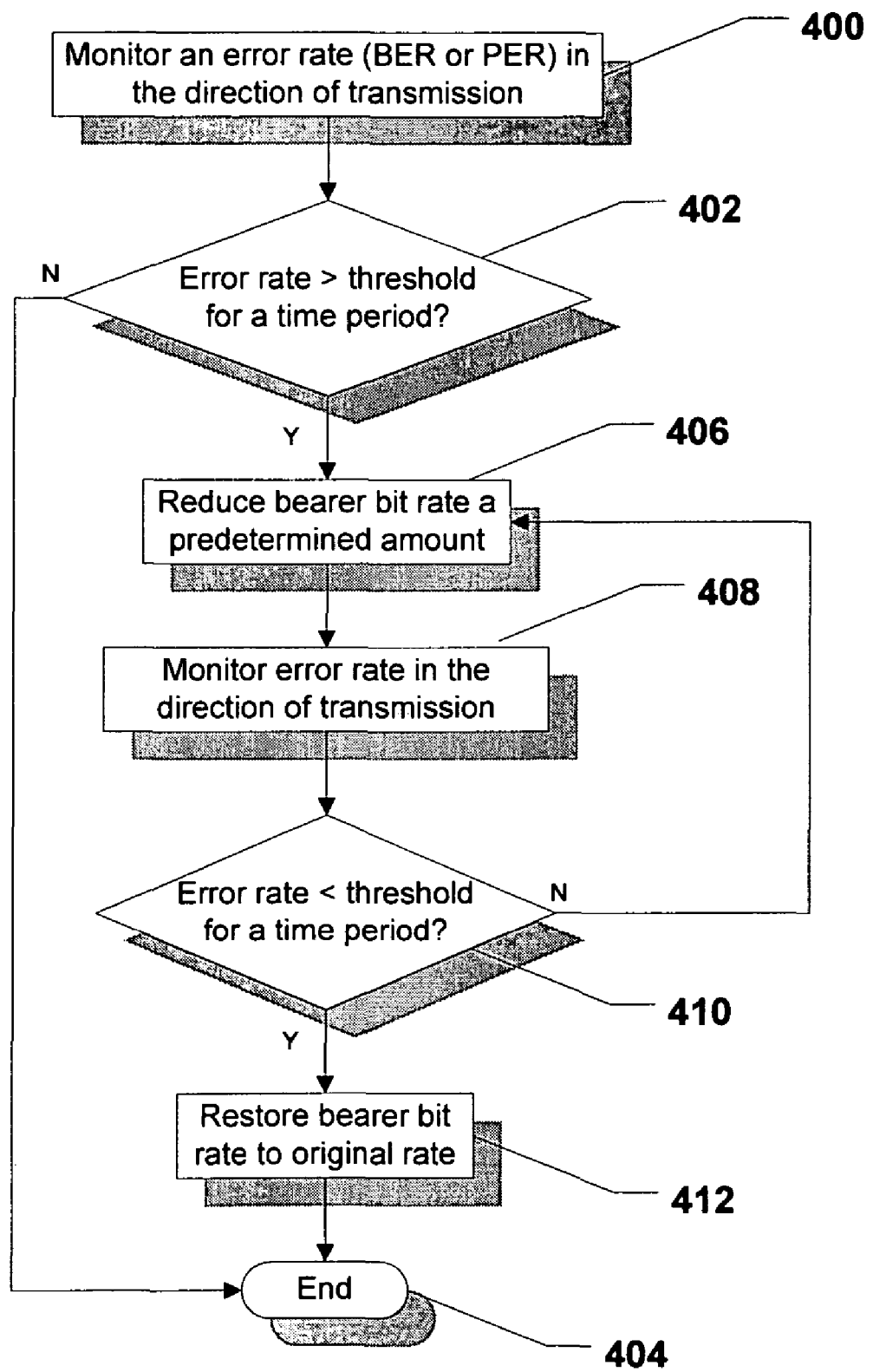
FIG. 4 is a flow chart to illustrate an alternate embodiment of managing data transmission in a DSL network.

FIG. 4 shows an alternate embodiment of managing data transmission in a DSL network. Commencing at block 400, a bit rate management module within a modem monitors an error-rate, e.g., a bit error rate (BER) or a packet error rate (PER), in the direction of transmission of data. In a particular embodiment, the BER can be determined by monitoring a frame cyclic redundancy check (CRC) parameter. Further, the PER can be determined by monitoring acknowledgement (ACK) packets or negative acknowledgement (NAK) packets.

At block 402, the bit rate management module determines whether the error rate is greater than a threshold for a predetermined time period. If not, the method ends at state 404. Otherwise, if the error rate is greater than the threshold for the time period, the method proceeds to block 406 and the bit rate management module reduces the bearer bit rate a predetermined amount.

Next, at block 408, the bit rate management module monitors the error rate in the direction of the data transmission after reducing the bit rate. Moving to decision step 410, the bit rate management module determines whether the error rate is less than the threshold for the time period. If not, the method returns to block 406, the bearer bit rate is reduced again, and the method continues as described above. If the error rate is less than the threshold for the time period, the method moves to block 412 and the bit rate management module restores the bearer bit rate to the original bearer bit rate in order to return the bearer to its original transmission capacity. The method then ends at state 404.

With the configuration of structure described above, the system and method of managing digital data transmissions provides a technique of rapidly changing the bit rate of a bearer within a digital data transmission line. A bit rate management module within a modem can increase a bit rate associated with a bearer quickly when necessary and decrease the bit rate when the added capacity for the bearer is not needed. In a particular embodiment, the bit rate can be increased or decreased in less than a second. Also, in a particular embodiment the bit rate can be increased or decrease in less than one-tenth of a second. Further, in a particular embodiment, the entire process can be encapsulated in a software program that can be executed by a computer connected to the DSL network, by one of the modems within a DSL circuit, or by both of the modems within a particular DSL circuit. In an embodiment in which the software program is executed by a computer connected to the DSL network, the computer can perform the monitoring and adjusting functions and signal the modems accordingly.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   measuring, at a telecommunication modem, a first number of payload bits communicated over a first bearer of a plurality of bearers during a first time period;
   dividing the first number of measured payload bits by a length of the first time period to yield a short term average bit rate for the first time period;
   increasing the short term average bit rate by adding a bit rate margin to yield a total bearer bit rate for the first time period, wherein the bit rate margin is based on the short term average bit rate;
   determining a bearer type of the first bearer, wherein the bearer type of the first bearer indicates whether the first bearer is one of a fixed bearer and an adaptive bearer;
   provisioning the first bearer with a bearer bit rate based on the bearer type to produce a provisioned bearer bit rate, wherein producing the provisioned bearer bit rate comprises:
      when the first bearer is the fixed bearer, provisioning the bearer bit rate to a predetermined fixed bearer bit rate that is independent of the short term average bit rate, wherein the predetermined fixed bearer bit rate is not altered by the provisioning; and
      when the first bearer is the adaptive bearer, provisioning the bearer bit rate based on the total bearer bit rate for the first time period, wherein the bearer bit rate for the adaptive bearer is a bit rate to transmit data over the first bearer during a second time period;
   determining whether a predetermined time period has expired, wherein the predetermined time period is less than one second;
   in response to determining that the predetermined time period has expired, updating the provisioned bearer bit rate;
   in response to determining that the predetermined time period has not expired, not updating the provisioned bearer bit rate;
   summing a plurality of provisioned bearer bit rates associated with the plurality of bearers for a line to yield a measured line bit rate;
   determining whether the measured line bit rate is greater than a maximum line bit rate;
   in response to determining that the measured line bit rate is greater than the maximum line bit rate, reducing the measured line bit rate to the maximum line bit rate, wherein reducing the measured line bit rate comprises reducing at least one provisioned bearer bit rate of the plurality of provisioned bearer bit rates; and
   in response to determining that the measured line bit rate is not greater than the maximum line bit rate, determining an amount of time since a last bit rate change.

2. The method of claim 1, further comprising:
   in response to determining that the first bearer is the adaptive bearer:
      rounding the total bearer bit rate for the first time period up to a next quantum level for the first bearer to yield a rounded total bearer bit rate; and
      provisioning the bearer bit rate to the rounded total bearer bit rate.

3. The method of claim 1, further comprising:
   determining whether the provisioned bearer bit rate is between a minimum bearer bit rate and a maximum bearer bit rate; and
   in response to determining that the provisioned bearer bit rate is not between the minimum bearer bit rate and the maximum bearer bit rate, modifying the provisioned bearer bit rate to be between the minimum bearer bit rate and the maximum bearer bit rate.

4. The method of claim 1, further comprising delaying a change from a first line bit rate to a second line bit rate in response to determining that the amount of time since the last bit rate change does not exceed a minimum amount of time.

5. The method of claim 1, further comprising changing from a first line bit rate to a second line bit rate when the amount of time since the last bit rate change exceeds a minimum amount of time.

6. The method of claim 1, further comprising:
   measuring, at the telecommunication modem, a second number of payload bits communicated over a second bearer of the plurality of bearers during the first time period;
   dividing the second number of measured payload bits by the length of the first time period to yield a second short term average bit rate for the first time period;
   increasing the second short term average bit rate by adding a second bit rate margin to yield a second total bearer bit rate for the second bearer during the first time period, wherein the second bit rate margin is based on the second short term average bit rate;
   determining a bearer type of the second bearer, wherein the bearer type of the second bearer indicates that the second bearer is one of the fixed bearer and the adaptive bearer;
   provisioning the second bearer with a second bearer bit rate based on the determined bearer type of the second bearer to produce a second provisioned bearer bit rate, wherein producing the second provisioned bearer bit rate comprises:
      when the second bearer is the fixed bearer, provisioning the second bearer bit rate to a second predetermined fixed bearer bit rate; and
      when the second bearer is the adaptive bearer, provisioning the second bearer bit rate based on the second total bearer bit rate for the first time period, wherein the second bearer bit rate for the adaptive bearer is a second bit rate to transmit data over the second bearer during the second time period;
   determining whether a second predetermined time period has expired, wherein the second predetermined time period is less than one second;
   in response to determining that the second predetermined time period has expired, updating the second bearer bit rate; and
   in response to determining that the second predetermined time period has not expired, not updating the second bearer bit rate.

7. The method of claim 1, further comprising increasing the bit rate margin in response to an increase in the short term average bit rate.

8. The method of claim 7, wherein the bit rate margin is increased in proportion to the increase in the short term average bit rate.

9. The method of claim 7, wherein the bit rate margin is increased by a set value.

10. The method of claim 1, further comprising decreasing the bit rate margin in response to a decrease in the short term average bit rate.

11. The method of claim 10, wherein the bit rate margin is decreased in proportion to the decrease in the short term average bit rate.

12. The method of claim 10, wherein the bit rate margin is decreased by a set value.

13. The method of claim 1, wherein the telecommunication modem is installed at one of a customer premises, a business, a central office associated with an interne service provider, and a digital subscriber line access multiplexer.

14. The method of claim 1, wherein the telecommunication modem is coupled to one of a digital subscriber line network, an asymmetric digital subscriber line network, an asymmetric digital subscriber 2+ line network, and a very high data rate digital subscriber line network.

15. The method of claim 1, wherein the telecommunication modem is communicatively coupled to at least one personal computing device.

16. The method of claim 1, further comprising:
determining a type of data transmitted over the first bearer for the first time period.

17. A method comprising:
determining, at a telecommunication modem, a new bearer bit rate for a first bearer of a plurality of bearers, wherein the new bearer bit rate is determined by:
measuring a first number of payload bits communicated over the first bearer during a time period;
dividing the first number of measured payload bits by a length of the time period to yield a short term average bit rate for the time period; and
increasing the short term average bit rate by adding a bit rate margin to yield a total bearer bit rate for the time period, wherein the bit rate margin is based on the short term average bit rate;
determining a bearer type of the first bearer, wherein the bearer type indicates whether the first bearer is one of a fixed bearer and an adaptive bearer;
provisioning a bearer bit rate the first bearer with the new bearer bit rate based on the bearer type to produce a provisioned bearer bit rate, wherein producing the provisioned bearer bit rate comprises:
when the first bearer is the fixed bearer, provisioning the new bearer bit rate to a predetermined fixed bearer bit rate that is independent of the short term average bit rate, wherein the predetermined fixed bearer bit rate is not altered by the provisioning;
when the first bearer is the adaptive bearer, selectively provisioning the new bearer bit rate based on the total bearer bit rate;
determining whether a predetermined time period has expired, wherein the predetermined time period is less than one second;
not updating the bearer bit rate to the new bearer bit rate when the predetermined time period has not expired;
updating the bearer bit rate to the new bearer bit rate when the predetermined time period has expired, wherein updating the bearer bit rate includes:
allocating a second number of payload bits in a frame to be transmitted over the first bearer;
sending a transmission configuration message that indicates the new bearer bit rate to a receiving device;
summing a plurality of provisioned bearer bit rates associated with the plurality of bearers for a line to yield a measured line bit rate;
determining whether the measured line bit rate is greater than a maximum line bit rate;
in response to determining that the measured line bit rate is greater than the maximum line bit rate, reducing the measured line bit rate to the maximum line bit rate, wherein reducing the measured line bit rate comprises reducing at least one provisioned bearer bit rate of the plurality of provisioned bearer bit rates; and
in response to determining that the measured line bit rate is not greater than the maximum line bit rate, determining an amount of time since a last bit rate change.

18. The method of claim 17, further comprising in response to determining that the measured line bit rate is not greater than the maximum line bit rate, increasing a current line bit rate to the maximum line bit rate.

19. The method of claim 17, wherein the total bearer bit rate for the time period is rounded up to a next quantum level.

20. An apparatus comprising:
a communication modem configured to:
measure a first number of payload bits communicated over a first bearer of a plurality of bearers during a first time period;
divide the first number of measured payload bits by a length of the first time period to yield a short term average bit rate for the first time period;
increase the short term average bit rate by adding a bit rate margin to yield a total bearer bit rate, wherein the bit rate margin is based on the short term average bit rate;
determine a bearer type of the first bearer, wherein the bearer type of the first bearer indicates whether the first bearer is one of a fixed bearer and an adaptive bearer;
provision the first bearer with a bearer bit rate based on the bearer type to produce a provisioned bearer bit rate, wherein producing the provisioned bearer bit rate comprises:
when the first bearer is the fixed bearer, provisioning the bearer bit rate to a fixed bearer bit rate that is independent of the short term average bit rate, wherein the fixed bearer bit rate is not altered by the provisioning; and
when the first bearer is the adaptive bearer, provisioning the bearer bit rate based on the total bearer bit rate for the first time period, wherein the bearer bit rate for the adaptive bearer is a bit rate to transmit data over the first bearer during a second time period;
determine whether a time period has expired, wherein the time period is less than one second;
update the provisioned bearer bit rate when the time period has expired;
not update the provisioned bearer bit rate when the time period has not expired;
sum a plurality of provisioned bearer bit rates associated with the plurality of bearers for a line to yield a measured line bit rate;
determine whether the measured line bit rate is greater than a maximum line bit rate;
when the measured line bit rate is greater than the maximum line bit rate, reduce the measured line bit rate to the maximum line bit rate, wherein at least one provisioned bearer bit rate of the plurality of provisioned bearer bit rates is reduced; and
when the measured line bit rate is not greater than the maximum line bit rate, determine an amount of time since a last bit rate change.

21. The apparatus of claim 20, wherein the communication modem is further configured to delay a change from a first line bit rate to a second line bit rate when the amount of time since the last bit rate change does not exceed a minimum amount of time.

22. The apparatus of claim 20, wherein the communication modem is further configured to change from a first line bit rate to a second line bit rate when the amount of time since the last bit rate change exceeds a minimum amount of time.

23. The apparatus of claim 20, wherein the communication modem is further configured to:
when the first bearer is the adaptive bearer:
round the total bearer bit rate for the first time period up to a next quantum level for the first bearer to yield a rounded total bearer bit rate; and
provision the bearer bit rate to the rounded total bearer bit rate.

24. The apparatus of claim 23, wherein a step size between a first quantum level and the next quantum level is 64 kilobits per second.

25. The apparatus of claim 20, wherein the communication modem is further configured to:
determine whether the provisioned bearer bit rate is between a minimum bearer bit rate and a maximum bearer bit rate; and
when the provisioned bearer bit rate is not between the minimum bearer bit rate and the maximum bearer bit rate, modify the provisioned bearer bit rate to be between the minimum bearer bit rate and the maximum bearer bit rate.

26. The apparatus of claim 20, wherein the communication modem is located at one of a customer premises, a business, a central office associated with an interne service provider, and a digital subscriber line access multiplexer.

27. The apparatus of claim 20, wherein the communication modem is coupled to one of a digital subscriber line network, an asymmetric digital subscriber line network, an asymmetric digital subscriber 2+ line network, and a very high data rate digital subscriber line network.

28. The apparatus of claim 20, wherein the communication modem is communicatively coupled to at least one computing device.

* * * * *